(12) United States Patent
Andersson et al.

(10) Patent No.: US 9,419,453 B2
(45) Date of Patent: Aug. 16, 2016

(54) EFFECTIVE CHARGING BY MULTIPLE CONTACT POINTS

(71) Applicant: Husqvarna AB, Huskvarna (SE)

(72) Inventors: Gunnar Andersson, Forserum (SE); Patrick Pettersson, Aneby (SE); Peter Hallin, Habo (SE); Patrik Jägenstedt, Tenhult (SE); Jonathan Björn, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 171 days.

(21) Appl. No.: 13/680,376

(22) Filed: Nov. 19, 2012

(65) Prior Publication Data

US 2013/0076304 A1  Mar. 28, 2013

Related U.S. Application Data

(63) Continuation-in-part of application No. PCT/SE2010/050546, filed on May 19, 2010.

(51) Int. Cl.
*H02J 7/00* (2006.01)
*A01D 34/00* (2006.01)
*B60L 11/18* (2006.01)

(52) U.S. Cl.
CPC ............. *H02J 7/0042* (2013.01); *A01D 34/008* (2013.01); *B60L 11/1818* (2013.01); *Y02T 10/7005* (2013.01); *Y02T 10/7072* (2013.01); *Y02T 90/14* (2013.01)

(58) Field of Classification Search
CPC ............... H02J 7/0042; Y02T 10/7005; Y02T 10/7072; Y02T 90/14; A01D 34/008; B60L 11/1818

USPC .................................................. 320/107, 109
See application file for complete search history.

(56) References Cited

U.S. PATENT DOCUMENTS

| 2,917,612 A | 12/1959 | Chabot |
| 3,937,995 A | 2/1976 | Devito |

(Continued)

FOREIGN PATENT DOCUMENTS

| DE | 7735570 U1 | 2/1978 |
| EP | 1430826 A2 | 6/2004 |

(Continued)

OTHER PUBLICATIONS

International Search Report and Written Opinion of PCT/SE2010/050546 mailed Nov. 22, 2011.

(Continued)

*Primary Examiner* — Nathaniel Pelton
(74) *Attorney, Agent, or Firm* — Nelson Mullins Riley & Scarborough LLP

(57) ABSTRACT

A charging coupling for connecting a robotic garden tool with a charging device may facilitate the charging of a battery of the robotic garden tool. The charging coupling may include a first charging contact and a second charging contact. The first charging contact may be a charging plate or a charging rod. The second charging contact may be provided with a row of resilient contact bars. The arrangement of the first charging contact and the second charging contact may be configured such that the resilient contact bars are pressed against the charging plate to provide multiple contact points.

17 Claims, 4 Drawing Sheets

(56) References Cited

U.S. PATENT DOCUMENTS

| | | | |
|---|---|---|---|
| 5,773,954 A * | 6/1998 | VanHorn | 320/137 |
| 5,786,106 A * | 7/1998 | Armani | H01M 2/1022 |
| | | | 429/100 |
| 7,306,878 B2 * | 12/2007 | Takeshita et al. | 429/97 |
| 2003/0094922 A1 | 5/2003 | Petersson et al. | |
| 2004/0158357 A1 * | 8/2004 | Lee et al. | 700/258 |
| 2005/0083011 A1 * | 4/2005 | Yang et al. | 320/107 |
| 2005/0166352 A1 | 8/2005 | Keppler et al. | |
| 2006/0043930 A1 * | 3/2006 | Koyanagi et al. | 320/114 |
| 2006/0087273 A1 * | 4/2006 | Ko et al. | 318/568.12 |
| 2007/0142964 A1 | 6/2007 | Abramson | |
| 2007/0142972 A1 | 6/2007 | Abramson et al. | |
| 2007/0229031 A1 * | 10/2007 | Song et al. | 320/128 |
| 2008/0007203 A1 | 1/2008 | Cohen et al. | |
| 2008/0174268 A1 * | 7/2008 | Koo et al. | 320/109 |
| 2008/0183349 A1 * | 7/2008 | Abramson et al. | 701/23 |
| 2009/0183478 A1 * | 7/2009 | Bernini | A01D 34/008 |
| | | | 56/10.2 A |
| 2010/0026239 A1 * | 2/2010 | Li et al. | 320/109 |
| 2010/0109890 A1 * | 5/2010 | Montplaisir et al. | 340/636.1 |
| 2010/0308768 A1 * | 12/2010 | Dower | 320/109 |
| 2011/0084649 A1 * | 4/2011 | Yang | 320/107 |
| 2011/0148364 A1 * | 6/2011 | Ota | 320/162 |
| 2011/0309791 A1 * | 12/2011 | Mitake | B60L 11/1816 |
| | | | 320/108 |

FOREIGN PATENT DOCUMENTS

| | | |
|---|---|---|
| EP | 1526626 A2 | 4/2005 |
| GB | 2407651 A | 5/2005 |
| WO | 2009070334 A1 | 6/2009 |

OTHER PUBLICATIONS

Chapter I International Preliminary Report on Patentability of PCT/SE20101050546 mailed Nov. 29, 2012.

* cited by examiner

EFFECTIVE CHARGING BY MULTIPLE CONTACT POINTS

CROSS REFERENCE TO RELATED APPLICATIONS

This application is a continuation-in-part of Application No. PCT/SE2010/050546, filed May 19, 2010, the contents of which are incorporated herein in their entirety.

TECHNICAL FIELD

The present invention relates to robotic garden tools. In particular, the present invention relates to a charging coupling for connecting a robotic garden tool with a charging device.

BACKGROUND

The robotic garden tools, such as, but not limited to, robotic lawnmowers are widely used for grass cutting applications in a lawn. Typically, a robotic lawnmower is an autonomous robotic garden tool and uses a battery as the power source. Based on the operating load and duration, the battery of the robotic lawnmower may get discharged periodically. A battery power level may be continuously monitored to identify the need of charging the battery by a charging device. It may be required to charge the battery in case the battery power level falls below a threshold power level during operation.

Typically, an arrangement for charging of the battery of the robotic lawnmower involves a metal plate and a leaf spring. The metal plate may be mounted on the robotic lawnmower and the leaf spring may be attached to the charging device. Further, electric current may be transferred between the charging contacts of the metal plate and the leaf spring to charge the battery of the robotic lawnmower. In other words, electric current may be transferred from the leaf spring of the charging device to the metal plate of the robotic lawnmower.

However, in this arrangement there is only a single point of contact for current transfer. This results in smaller contact area and hence less efficient charging of the battery. Further, poor contact between the metal plate and the leaf spring may lead to heat generation in the components and loss of energy.

In light of the foregoing, there is a need for an improved system to charge a robotic garden tool, which will overcome the disadvantages of less efficient current transfer and energy loss.

SUMMARY

In view of the above, it is an objective to solve or at least reduce the problems discussed above. In particular, an objective is to provide a charging coupling to connect a robotic garden tool to a charging device such that the loss of energy during charging of a battery of the robotic garden tool is minimized.

The objective is achieved by a charging coupling for connecting a robotic garden tool to a charging device as described in claim 1. The charging coupling includes a first charging contact and a second charging contact. Contact between the first charging contact and the second charging contact facilitates transfer of electric current for charging of the battery of the robotic garden tool. The second charging contact may comprise a row of at least two resilient contact bars to provide multiple contact points between the first and the second charging contact. Moreover, when the resilient contact bars are pressed against the first charging contact, the multiple contact points allow efficient transfer of electric current between the first and the second charging contact. Further, energy loss due to poor contact is also minimized. Provided is also a charging coupling comprising simple and cost-effective components.

According to claim 2, the second charging contact may comprise a row of at least three resilient contact bars, preferably at least four resilient contact bars, and more preferably at least six resilient contact bars. Thereby, the transfer of electric current between the first and the second charging contacts may become more efficient due to an increased number of contact points.

According to claim 3, the second charging contact may comprise a base plate. The row of resilient contact bars may protrude away from the base plate. Thus, the second charging contact may be made of a single stamped plate making it a very cheap component.

According to claim 4, the base plate in the second charging contact may be attached to the charging device. Specifically, the electric current may be transferred from the charging device via the multiple contact points to the first charging contact. The first charging contact may be a charging plate or a charging rod in accordance with claim 5. The charging plate or the charging rod may be made of an electrically conducting material.

According to claim 6, the first charging contact may be mounted on the robotic garden tool and the second charging contact may be mounted on the charging device. Alternatively, according to claim 7, the first charging contact may be mounted on the charging device and the second charging contact may be mounted on the robotic garden tool. In various embodiments of the present invention, the second charging contact may be provided with two holes for mounting it on the charging device or the robotic garden tool.

According to claim 8, the charging coupling may allow transfer of electric current from the charging device to the robotic garden tool. Specifically, the electric current may be transferred through the multiple contact points provided between the first and the second charging contacts.

According to claim 9, the length of the contact bars may lie in the range of 10-100 millimeters, preferably in the range of 30-60 millimeters, and more preferably in the range of 40-50 millimeters. Further, according to claim 10, the width of the contact bars may lie in the range of 3-20 millimeters, preferably in the range of 4-8 millimeters, and more preferably in the range of 5-6 millimeters. Still further, according to claim 11, the thickness of the contact bars may be in the range of 0.5-5 millimeters, preferably in the range of 0.5-2 millimeters, and more preferably in the range of 0.7-1 millimeters.

Further, the contact bars may be adapted to spring when in electrical connection with the first charging contact. According to claim 12, the resilient contact bars may be adapted to spring in the range of 0.5-5 millimeters, preferably in the range of 0.7-3 millimeters, and more preferably in the range of 1-2 millimeters. Thereby, a tight connection between the contact bars and the first charging contact it may be more securely provided.

BRIEF DESCRIPTION OF THE DRAWINGS

The invention will in the following be described in more detail with reference to the enclosed drawings, wherein.

DESCRIPTION OF EMBODIMENTS

Figure 1:
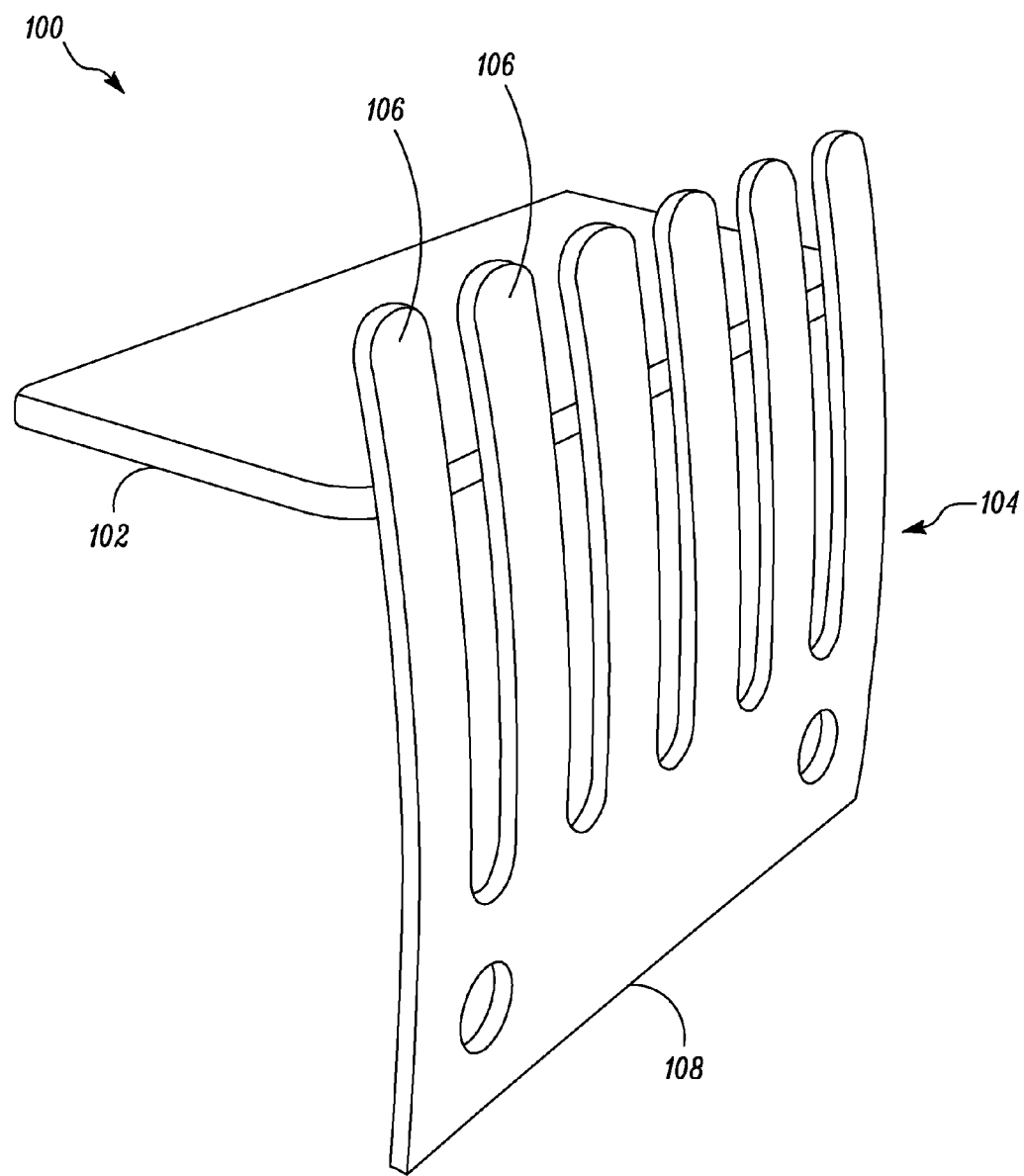
FIG. 1 illustrates a charging coupling for connecting a robotic garden tool to a charging device, according to an embodiment of the present invention.

The present invention will be described more fully hereinafter with reference to the accompanying drawings, in which example embodiments of the invention incorporating one or more aspects of the present invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. For example, one or more aspects of the present invention can be utilized in other embodiments and even other types of devices. In the drawings, like numbers refer to like elements.

The robotic garden tools, such as, but not limited to, robotic lawnmowers are typically used for grass cutting applications in a lawn. The robotic lawnmower is an autonomous robotic garden tool and uses a battery as the power source. Based on the operating load and duration, the battery of the robotic lawnmower may get discharged periodically. Thus, it may be required to charge the battery in case the battery power level falls below a threshold power level during operation.

The invention relates to a charging coupling which may be used for connecting the robotic garden tool to a charging device. The charging coupling facilitates efficient charging of the battery of the robotic garden tool. Although the example embodiment is shown to be used in conjunction with the robotic lawnmower, it should be understood that the present invention could be incorporated into any suitable type of robotic garden tool and is not limited to use merely with the robotic lawnmower and, may be incorporated in different types of embodiments.

FIG. 1 illustrates a charging coupling 100 for connecting the robotic garden tool to a charging device, according to an embodiment of the present invention. The robotic garden tool may be provided with a power source for drawing power during its operation. In an embodiment of the present invention, a battery may be used as the power source of the robotic garden tool. Based on the operating load and duration, a power level of the battery may fall down thus requiring subsequent charging for continuous operation. The charging coupling 100 may allow charging of the battery of the robotic garden tool. In various embodiments of the present invention, the robotic garden tool may be a robotic lawnmower.

The power level of the battery may be monitored to decide whether the battery needs to be charged or not. In an embodiment of the present invention, the power level of the battery may be compared with a predetermined threshold power level. When the power level falls below the predetermined threshold power level, the battery may be connected to the charging device for charging.

Referring to FIG. 1 now, the charging coupling 100 may include a first charging contact 102 and a second charging contact 104. In an embodiment of the present invention, the first charging contact 102 may be a charging plate. In an alternate embodiment of the present invention, the first charging contact 102 may be a charging rod. In various embodiments of the present invention, the first charging contact 102 may be made of an electrically conducting material such as, but not limited to, metal or other similar material.

Further, the second charging contact 104 of the charging coupling 100 may include a row of at least two resilient contact bars 106. In an embodiment of the present invention, the second charging contact 104 may include a row of three contact bars 106. In another embodiment of the present invention, the second charging contact 104 may include a row of four contact bars 106. In yet another embodiment of the present invention, the second charging contact 104 may include a row of six contact bars 106. Referring to FIG. 1, the second charging contact 104 may comprise a base plate 108. Further, the contact bars 106 may protrude away from the base plate 108. In various embodiments of the present invention, the second charging contact 104 may be made of a single stamped plate made of an electrically conducting material such as, but not limited to, stainless steel or other similar material.

The contact bars 106 of this example may extend or protrude in a direction that facilitates contact between the first and second charging contacts 102 and 104. Thus, in some embodiments, the contact bars 106 may be embodied as conducting extensions, rods, detents, protruding members, fingers, and/or the like that extend substantially parallel to each other while also being substantially aligned in a same plane to form a contact surface. However, it should be appreciated that the contact bars 106 could take any suitable shape and, in some embodiments, could be embodied as one or more flat contact surfaces or any other suitable structure for forming a contact surface. Moreover, although the contact bars 106 of an example embodiment may be at least partially resilient or flexible, in some cases, the contact bars 106 could be rigid.

The charging coupling 100 allows connection of the robotic garden tool and the charging device. Referring to FIG. 1, the arrangement of the first charging contact 102 and the second charging contact 104 may be configured such that the resilient contact bars 106 are pressed against the charging plate and thus provides multiple contact points. Specifically, the first charging contact 102 and the second charging contact 104 of the charging coupling 100 may allow transfer of electric current through multiple contact points. In various embodiments of the present invention, presence of the multiple contact points may facilitate an efficient transfer of electric current between the first charging contact 102 and the second charging contact 104.

The multiple contact points may be used for transfer of electric current for charging the battery of the robotic garden tool. In an embodiment of the present invention, the first charging contact 102 may be mounted on the robotic garden tool and the second charging contact 104 may be mounted on the charging device. In this embodiment of the present invention, the battery of the robotic garden tool may be charged by transfer of electric current from the contact bars 106, through the multiple contact points, to the charging plate. In an alternate embodiment of the present invention, the first charging contact 102 may be mounted on the charging device and the second charging contact 104 may be mounted on the robotic garden tool. Thus, in the alternate embodiment, the battery of the robotic garden tool may be charged by transfer of electric current from the charging plate, through the multiple contact points, to the contact bars 106. In various embodiments of the present invention, the base plate 108 may be provided with two holes for mounting the second charging contact 104 on the robotic garden tool or the charging device.

Figure 2:
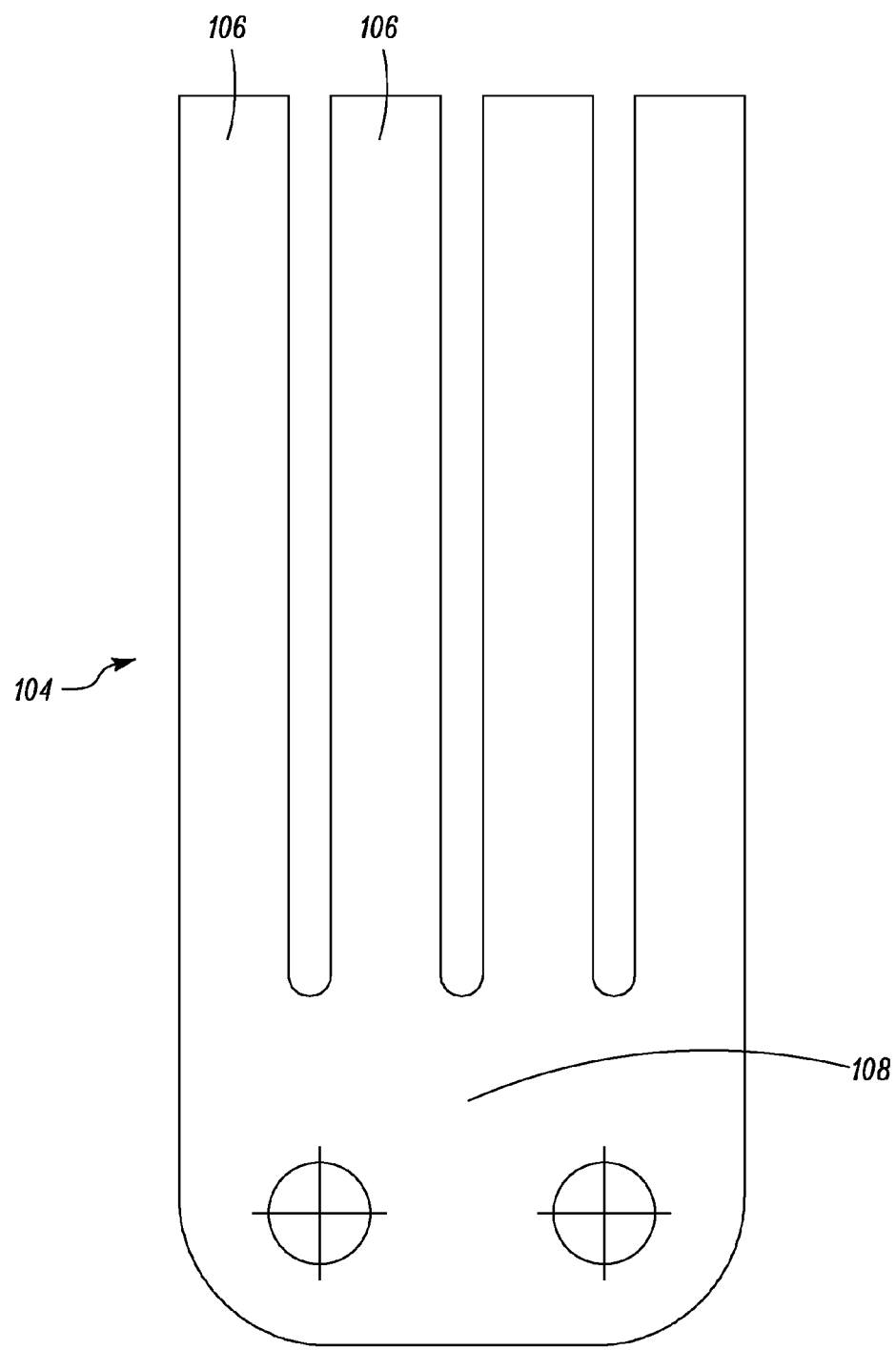
FIG. 2 illustrates a perspective view of a second charging contact of the charging coupling, according to an embodiment of the present invention.

FIG. 2 illustrates a perspective view of the second charging contact 104 of the charging coupling 100, according to an embodiment of the present invention. In this exemplary embodiment, the second charging contact 104 may include a row of four resilient contact bars 106. Referring to FIG. 2, an unfolded view of the second charging contact 104 is illustrated where the second charging contact 104 is provided with two holes for facilitating its mounting on the charging device or the robotic garden tool. In an embodiment of the present invention, the second charging contact 104 may be mounted on a robotic lawnmower. The contact bars 106 provides multiple contact points between the first charging contact 102 and the second charging contact 104. The contact bars 106 may be adapted to spring when in electrical connection with the first charging contact 102. In an embodiment of the present invention, the contact bars 106 may be adapted to spring in the range of about 0.5-5 millimeters when in connection with the first charging contact 102. In another embodiment of the present invention, the contact bars 106 may be adapted to spring in the range of about 0.7-3 millimeters. In yet another embodiment of the present invention, the contact bars 106 may be adapted to spring in the range of about 1-2 millimeters.

Figure 3:
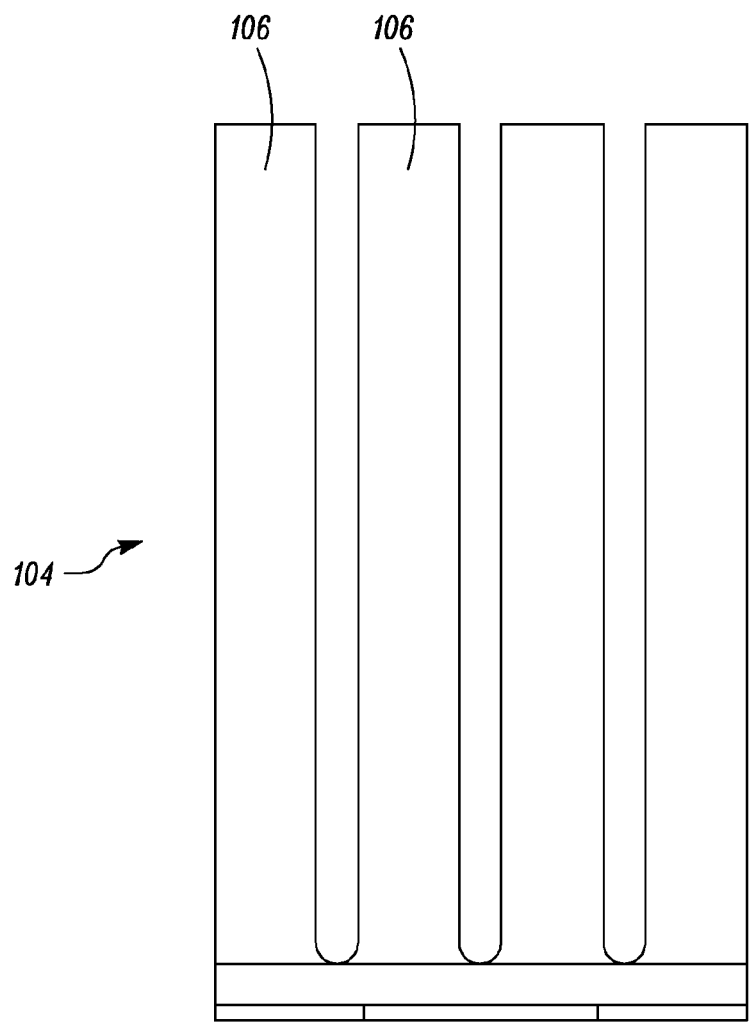
FIG. 3 illustrates another perspective view of the second charging contact of the charging coupling, according to an embodiment of the present invention.
Figure 3:
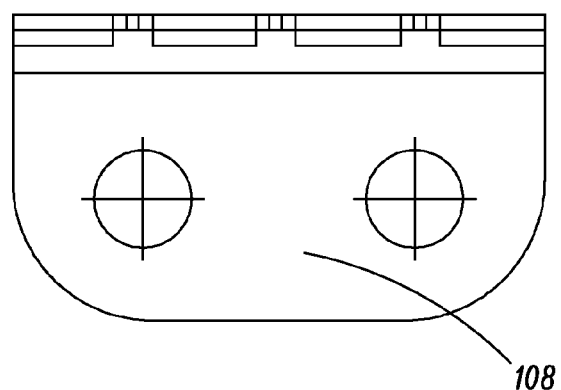

FIG. 3 illustrates another perspective view of the second charging contact 104 of the charging coupling 100 in accordance with an embodiment of the present invention. Referring to FIG. 3, the second charging contact 104 may include a row of four resilient contact bars 106 and the base plate 108. Further, the base plate 108 may be provided with two holes for mounting the second charging contact 104 on the robotic garden tool or the charging device. The base plate 108 may further be folded relative to the contact bars 106. The base plate 108 may form an angle with the contact bars 106. The angle may be in the range of about 85-95 degrees, preferably of about 88-90 degrees. In an embodiment of the present invention, length of the contact bars 106 may vary in the range of about 10-100 millimeters. In another embodiment of the present invention, length of the contact bars 106 may vary in the range of about 30-60 millimeters. In yet another embodiment of the present invention, length of the contact bars 106 may vary in the range of about 40-50 millimeters. Further, in an embodiment of the present invention, width of the contact bars 106 may vary in the range of about 3-20 millimeters. In another embodiment of the present invention, width of the contact bars 106 may vary in the range of about 4-8 millimeters. In another embodiment of the present invention, width of the contact bars 106 may vary in the range of about 5-6 millimeters. Still further, in an embodiment of the present invention, thickness of the contact bars 106 may vary in the range of about 0.5-5 millimeters. In another embodiment of the present invention, thickness of the contact bars 106 may vary in the range of about 0.5-2 millimeters. In yet another embodiment of the present invention, thickness of the contact bars 106 may vary in the range of about 0.7-1 millimeters.

Figure 4:
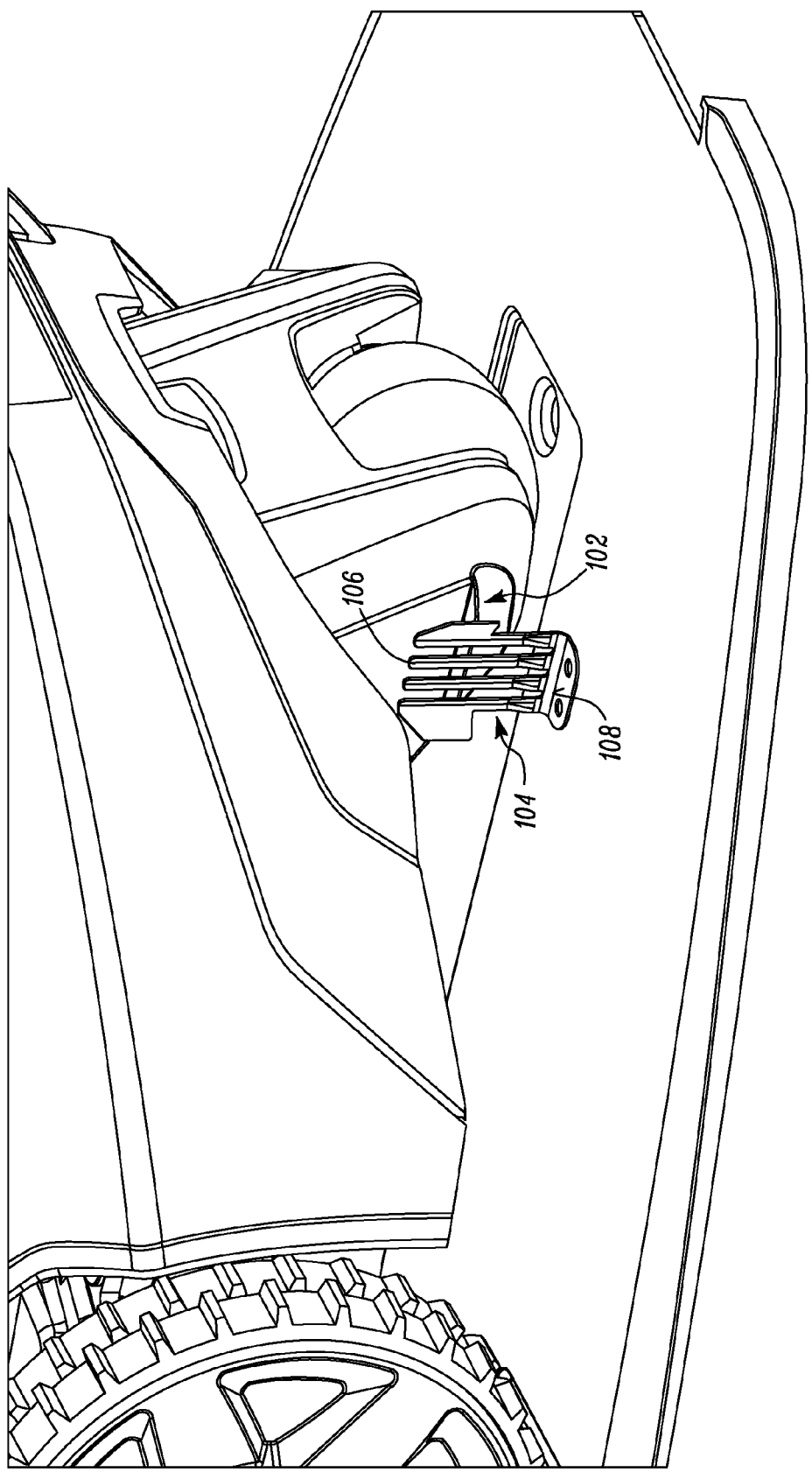
FIG. 4 illustrates another perspective view of the second charging contact and the first charging contact of the charging coupling operationally disposed on a robotic lawnmower and charging station, respectively, according to an embodiment of the present invention.

FIG. 4 illustrates another perspective view of the second charging contact 104 and the first charging contact 102 of the charging coupling operationally disposed on a robotic lawnmower and charging station, respectively, according to an embodiment of the present invention. In this regard, FIG. 4 shows an alternative structure for the row of four resilient contact bars 106 and also shows the contact bars 106 and the base plate 108 in an operational context relative to the robotic lawnmower and charging station.

Though the above mentioned invention explains the working with respect to robotic garden tool, a person skilled in the art may know that such a system may be easily implemented in other tools such as, but not limited to, automated vacuum cleaners.

In the drawings and specification, there have been disclosed preferred embodiments and examples of the invention and, although specific terms are employed, they are used in a generic and descriptive sense only and not for the purpose of limitation, the scope of the invention being set forth in the following claims.

The invention claimed is:

1. A charging coupling for connecting a robotic garden tool to a charging device, comprising;
    a first charging contact comprising a contact edge, wherein the first charging contact is disposed on a lateral side of the robotic garden tool; and
    a second charging contact comprising a row of at least two resilient contact bars for providing multiple contact points between the first charging contact and the second charging contact, the at least two resilient contact bars comprising a contact face and an opposite face, wherein the row of resilient contact bars extends vertically upward and away from a charging station,
    wherein the first and second charging contacts are configured to establish a charging connection between the contact edge of the first charging contact and the contact face of the second charging contact, in response to the robotic vehicle driving onto the charging station,
    wherein the second charging contact comprises a base plate and wherein the row of resilient contact bars protrude away from the base plate,
    wherein the second charging contact forms about a 90 degree angle between the base plate and the row of resilient contact bars, and
    wherein the base plate comprises one or more mounting holes on a first side of the about 90 degree angle and a second side of the about 90 degree angle has a common direction of extension as the row of resilient contact bars.

2. A charging coupling according to claim 1, wherein the second charging contact comprises a row of at least three resilient contact bars.

3. A charging coupling according to claim 1, wherein the base plate in the second charging contact is attached to the charging device.

4. A charging coupling according to claim 1, wherein the first charging contact is a charging plate or a charging rod.

5. A charging coupling according to claim 1, wherein the first charging contact is mounted on the robotic garden tool and the second charging contact is mounted on the charging device.

6. A charging coupling according to claim 1, wherein the charging coupling is adapted to provide transfer of electric current from the charging device, through the multiple contact points, to the robotic garden tool.

7. A charging coupling according to claim 1, wherein the at least two resilient contact bars are between 10-100 mm long.

8. A charging coupling according to claim 1, wherein each of the at least two resilient contact bars is between 3-20 mm wide.

9. A charging coupling according to claim 1, wherein the second charging contact has a thickness of between 0.5-5 mm.

10. A charging coupling according to claim 1, wherein the at least two resilient contact bars are adapted to spring between 0.5-5 mm when in connection with the first charging contact.

11. A charging coupling according to claim 1, wherein the second charging contact comprises a single stamped plate.

12. A charging coupling according to claim 1, wherein the at least two contact bars are aligned in a same plane.

13. A charging coupling according to claim 1, wherein a direction of extension of the first charging contact is perpendicular to a direction of extension of the second charging contact.

14. A charging coupling according to claim 1, wherein the second charging contact comprises a base plate and wherein the row of resilient contact bars protrude away from the base plate, wherein the second charging contact is a single element.

15. A charging coupling according to claim 1, wherein the contact face of the second charging contact is substantially parallel to the lateral side of the robotic garden tool.

16. A charging coupling for connecting a robotic garden tool to a charging device, comprising:
   a first charging contact comprising a charging plate comprising a first and second face defining a contact edge, wherein the first charging contact is disposed on a lateral side of the robotic garden tool; and
   a second charging contact comprising a row of at least two resilient contact bars for providing multiple contact points between the first charging contact and the second charging contact, the at least two resilient contact bars comprising a contact face and an opposing face, wherein the row of resilient contact bars extends vertically upward and away from a charging station,
   wherein the first and second charging contacts are configured to establish a charging connection between the contact edge of the first charging contact and the contact face of the second charging contact, in response to the robotic vehicle driving onto the charging station,
   wherein the second charging contact comprises a base plate and wherein the row of resilient contact bars protrude away from the base plate,
   wherein the second charging contact forms about a 90 degree angle between the base plate and the row of resilient contact bars, and
   wherein the base plate comprises one or more mounting holes on a first side of the about 90 degree angle and a second side of the about 90 degree angle has a common direction of extension as the row of resilient contact bars.

17. A charging coupling for connecting a robotic garden tool to a charging device, comprising:
   a first charging contact comprising a charging rod including a contact edge, wherein the first charging contact is disposed on a lateral side of the robotic garden tool; and
   a second charging contact comprising a row of at least two resilient contact bars for providing multiple contact points between the first charging contact and the second charging contact, the at least two resilient contact bars comprising a contact face and an opposing face, wherein the row of resilient contact bars extends vertically away from a charging station,
   wherein the first and second charging contacts are configured to establish a charging connection between the contact edge of the first charging contact and the contact face of the second charging contact, in response to the robotic vehicle driving onto the charging station,
   wherein the second charging contact comprises a base plate and wherein the row of resilient contact bars protrude away from the base plate,
   wherein the second charging contact forms about a 90 degree angle between the base plate and the row of resilient contact bars, and
   wherein the base plate comprises one or more mounting holes on a first side of the about 90 degree angle and a second side of the about 90 degree angle has a common direction of extension as the row of resilient contact bars.

* * * * *